(12) United States Patent
Shigeta et al.

(10) Patent No.: US 6,831,767 B2
(45) Date of Patent: Dec. 14, 2004

(54) TRAVELING WAVE OPTICAL MODULAR

(75) Inventors: Junji Shigeta, Fuchu (JP); Masataka Shirai, Higashimurayama (JP); Shinji Tsuji, Hidaka (JP); Hideo Arimoto, Kokubunji (JP)

(73) Assignee: Opnext Japan, Inc., Yokohama (JP)

( * ) Notice: Subject to any disclaimer, the term of this patent is extended or adjusted under 35 U.S.C. 154(b) by 46 days.

(21) Appl. No.: 10/459,472

(22) Filed: Jun. 12, 2003

(65) Prior Publication Data

US 2004/0001242 A1 Jan. 1, 2004

(30) Foreign Application Priority Data

Jun. 13, 2002 (JP) ........................................ 2002-172766

(51) Int. Cl.[7] .............................. G02F 1/01; G02F 1/03
(52) U.S. Cl. ........................ 359/240; 359/245; 359/248
(58) Field of Search ................................ 359/240, 245, 359/248, 239, 238, 254, 276, 278

(56) References Cited

U.S. PATENT DOCUMENTS 6,160,654 A * 12/2000 Kawano ..................... 359/248
6,545,791 B1 * 4/2003 McCaughan et al. ........ 359/245
6,590,691 B1 * 7/2003 Nagra et al. ................ 359/237

* cited by examiner

Primary Examiner—Georgia Epps
Assistant Examiner—Tim Thompson
(74) Attorney, Agent, or Firm—Antonelli, Terry, Stout & Kraus, LLP

(57) ABSTRACT

An optical modulator having a good reflection characteristic over a broad band is provided, with a small semiconductor chip area, by use of a semiconductor chip on which a semiconductor optical modulator is mounted. A typical example of the optical modulator has a structure in which a semiconductor chip provided with an electro-absorption semiconductor optical modulator comprising an electrode of traveling wave modulator is mounted on a dielectric substrate provided with a transmission line, and the characteristic impedance of at least a part of the transmission line is set to be greater than the output impedance of a modulator driver circuit and the impedance of an optical modulator portion. By this, a broad band optical modulator with excellent reflection characteristic can be provided by use of a semiconductor chip which is small in area.

13 Claims, 7 Drawing Sheets

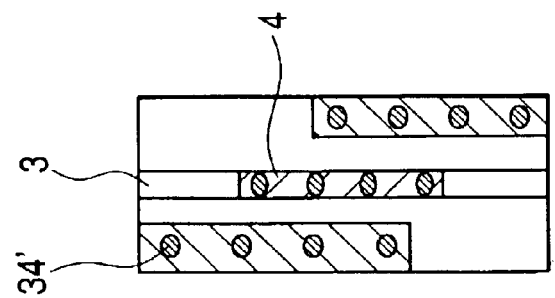
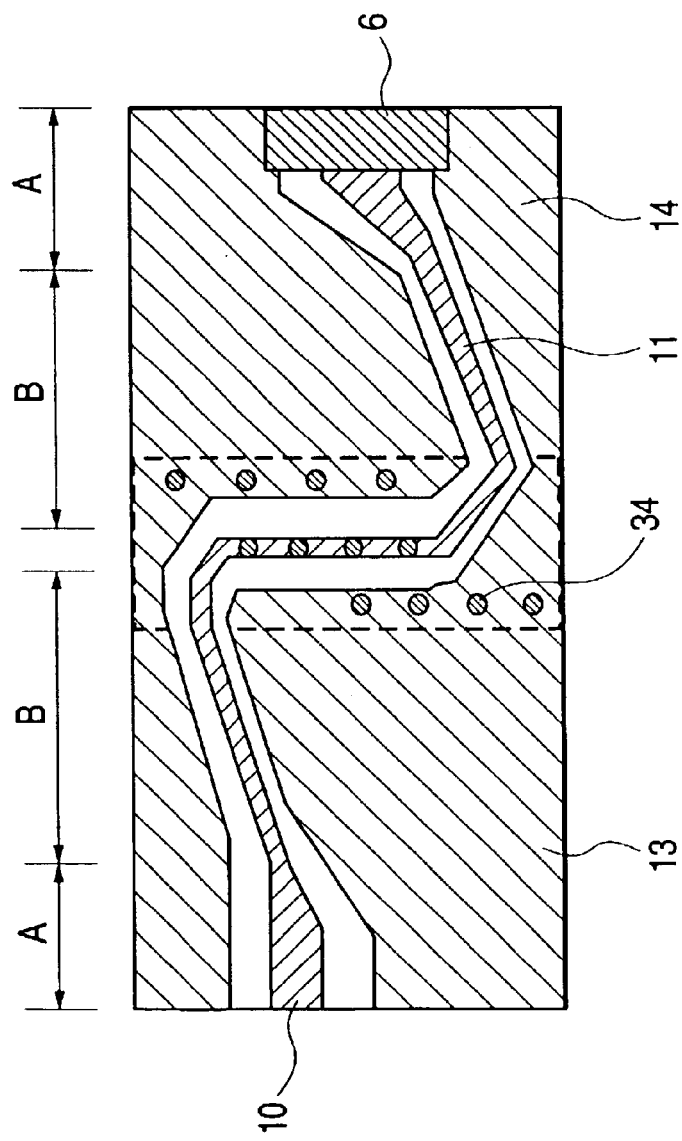

TRAVELING WAVE OPTICAL MODULAR

BACKGROUND OF THE INVENTION

1. Field of the Invention

The present invention relates to an optical modulator using an electro-absorption semiconductor modulator comprising an electrode of traveling wave modulator, in an optical communication system.

2. Related Arts

As to an optical communication light source in an optical communication system, there has been a continued demand for a higher speed. At present, a communication system with a transmission rate of 10 Gbits/s per channel has already been put to practical use, and a system with a transmission rate of 40 Gbits/s per channel has been developed aiming at practical use thereof. As an optical communication light source for use in such a high-speed optical communication system, an optical modulator is used. In particular, an electro-absorption optical modulator composed of a semiconductor material is a modulator which is small in size and capable of being driven at a low voltage. Furthermore, in order to broaden the band of the optical modulator, a method of adopting an electrode of traveling wave modulator has been proposed. An example of this is seen, for example, in Japanese Patent Laid-open No. 2001-326413. In this structure, the electrode is designed as a transmission line of distributed element for passing a high-frequency signal from an external modulator driver circuit and leading the signal to an external terminal resistor.

With this structure, the problem that the band is restricted by the electrostatic capacitance of an element as in the case of a lumped element can be obviated. In addition, in such a high-speed element, matching in impedance between the driver circuit and the element is required. While a method for impedance matching is not disclosed in the above-mentioned Japanese Patent Laid-open No. 2001-326413, a method of providing an impedance matching circuit composed of a coil and a capacitor between an input/output connector and an electrode of an optical device is disclosed, for example, in Japanese Patent Laid-open No. Hei 7-98442. Besides, Japanese Patent Laid-open No. Hei 9-900 discloses a method of providing a line having an impedance between the input impedance of the semiconductor chip and the output impedance of the driver circuit in on the portion between the semiconductor chip provided with the lumped element optical modulator and the driver circuit connector.

However, these impedance matching methods have the problem that the impedance matching can be achieved only for a signal at a specified impedance and it is impossible to obtain a characteristic with little signal reflection over a broad band. In addition, a modulator element having an electrode of traveling wave modulator as disclosed in the above-mentioned Japanese Patent Laid-open No. 2001-326413 has the problem that the area of the semiconductor chip would be large.

In view of the foregoing technical background, it is an object of the present invention to provide, in a small size, a semiconductor optical modulator in which reflection of an externally inputted high-frequency signal is little.

SUMMARY OF THE INVENTION

The present invention, basically, has the following constitution. Namely, an optical modulator according to the present invention has at least a transmission line, and a semiconductor chip provided at least with a semiconductor optical modulator, on a dielectric substrate. The transmission line is connected at least electrically to a first end portion of an electrode of the semiconductor optical modulator, and the semiconductor optical modulator can be driven by inputting a high-frequency signal from a modulator driver circuit to the transmission line. The characteristic impedance of at least a part of the transmission line is set to be greater than the output impedance of the modulator driver circuit.

The semiconductor optical modulator is typically exemplified by an electro-absorption semiconductor optical modulator, and a practical mode for carrying out the present invention is as follows. Namely, the traveling wave optical modulator according to the present mode comprises at least a first transmission line, a semiconductor chip provided at least with an electro-absorption semiconductor optical modulator, and a second transmission line, on a dielectric substrate. The electro-absorption semiconductor optical modulator comprises at least an electrode of traveling wave modulator, and an optical waveguide overlapping with the electrode of traveling wave modulator and having a region parallel to the electrode of traveling wave modulator. Further, the first transmission line is electrically connected to a first end portion of the electro-absorption semiconductor optical modulator via a first transmission line on the chip, whereas the second transmission line is electrically connected to a second end portion of the electro-absorption semiconductor optical modulator via a second transmission line on the chip, and the semiconductor optical modulator can be driven by inputting a high-frequency signal from a modulator driver circuit to the first transmission line. Furthermore, in the present invention, it is essential that the characteristic impedance of at least a part of the first transmission line is set to be greater than the output impedance of the modulator driver circuit.

Incidentally, in the present invention, the traveling wave optical modulator can be realized by omitting the second transmission line. The details of this will be described later.

Furthermore, it is convenient that the characteristic impedance of at least a part of the first transmission line is set to be greater than the input impedance of the electro-absorption semiconductor optical modulator from an end portion of the first transmission line.

For the optical modulator according to the present invention, a mode of integrating a semiconductor laser element directly on a substrate for the optical modulator is of use. The optical modulator is so constituted that the light emitted from the semiconductor laser is incident on an optical waveguide of the electro-absorption semiconductor optical modulator. Thus, the light emitted from the semiconductor laser is used, without introducing light from the exterior of the optical modulator.

A terminal resistor for terminating the signal having driven the optical modulator may further be integrated on the semiconductor chip.

As for the mode of mounting the semiconductor chip on a dielectric substrate, two modes can generally be adopted.

A first mode is a method of using a metallic ribbon, and a second mode is a method of using a solder layer.

Specifically, in the first mode, a semiconductor chip comprising an electro-absorption semiconductor optical modulator is mounted on a dielectric substrate so that the primary surface thereof provided with an active portion is directed up. When transmission lines on the chip which are electrically connected to both ends of an electrode of traveling wave modulator of the electro-absorption semiconductor optical modulator are made to be a third transmission line and a fourth transmission line, respectively, the first transmission line is electrically connected through a metallic ribbon to the third transmission line on the semiconductor chip on which the electro-absorption semiconductor optical modulator is mounted, whereas the second transmission line is electrically connected through a metallic ribbon to the fourth transmission line on the semiconductor chip on which the electro-absorption semiconductor optical modulator is mounted.

In the second mode, a semiconductor chip comprising an electro-absorption semiconductor optical modulator is mounted on a dielectric substrate so that the primary surface thereof provided with an active portion is directed down.

The first transmission line is electrically connected through a solder layer to the first transmission line on the semiconductor chip on which the electro-absorption semiconductor optical modulator is mounted, whereas the second transmission line is electrically connected through a solder layer to the second transmission line on the semiconductor chip on which the electro-absorption semiconductor optical modulator is mounted.

In addition, it is useful that a circuit for driving the electro-absorption semiconductor optical modulator is further mounted on the dielectric substrate. Further, a resistor for terminating a signal for driving the electro-absorption semiconductor modulator may be mounted on the dielectric substrate, and may be electrically connected to the second transmission line.

BRIEF DESCRIPTION OF THE DRAWINGS

FIGS. 13A and 13B are plan views showing a seventh embodiment of the present invention in which a continuous transmission line is provided on a dielectric substrate, in the junction-down mounting.

DETAILED DESCRIPTION OF THE PREFERRED EMBODIMENTS

Before describing specifically some embodiments of the present invention, the basic mode of carrying out the present invention will be described in detail.

Figure 1:
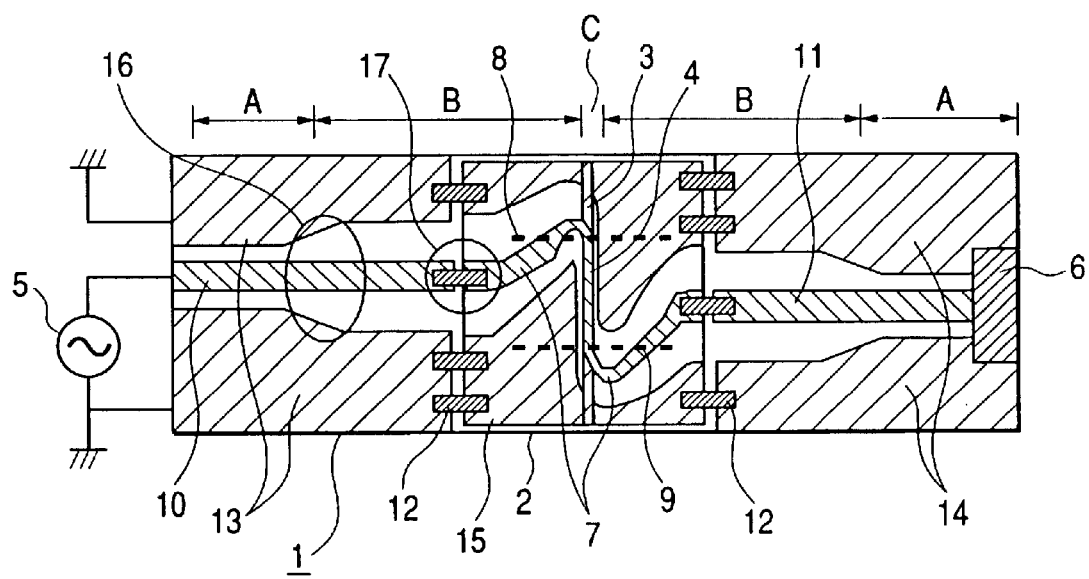
FIG. 1 is a top plan view of an optical modulator in which a semiconductor chip is mounted on a dielectric substrate, showing a first embodiment of the present invention.

FIG. 1 is a top plan view of an optical modulator in which a semiconductor chip 2 provided with an electro-absorption optical modulator is mounted on a dielectric substrate 1 formed of a ceramic or the like. At least an optical modulator portion, a first transmission line 10, and a second transmission line 11 are mounted on the semiconductor chip 2. The optical modulator portion 4 comprises an optical waveguide portion 3 for transmitting light inputted from a laser element, and an electro-absorption optical modulator portion 4 capable of varying the intensity of light through application of a voltage. Further, an electrode of traveling wave modulator 7 for transmitting a high-frequency signal from a modulator driver circuit 5 to the modulator portion 4 and leading the signal to a terminal resistor 6. The terminal resistor 6 may also be provided on the dielectric substrate 1. The electrode of traveling wave modulator 7 is so disposed as to be astride (or to intersect) a straight line 8 and a straight line 9 which are extensions, orthogonally to the waveguide direction, of both ends of the width in the direction parallel to the optical waveguide 3 of the optical modulator. In the present mode, first and second transmission lines 10 and 11 are provided on the dielectric substrate 1, and are connected to the electrode of traveling wave modulator 7 though metallic ribbon bonds 12. In addition, ground electrodes 13, 14 and 15 which constitute coplanar lines in pairs with the transmission lines 10, 11 and the electrode of traveling wave modulator 7 are also connected to each other by ribbon bonds 12 so as to be set at an equal potential.

With this constitution, a high-frequency signal from the modulator driver circuit 5 is led through the transmission line 10 on the dielectric substrate 1 to the electrode of traveling wave modulator 7 of the semiconductor chip 2, to drive the optical modulator portion 4. From this point on, the signal is transmitted through the transmission line 11 on the dielectric substrate 1 to the terminal resistor 6, in the present circuit.

When such a circuit is divided into regions A, B and C as shown in FIG. 1, the regions A are connected to the modulator driver circuit 5 and the terminal resistor 6, so that the characteristic impedance thereof is designed to be a predetermined value, for example, typically 50 Ω. The impedance of the region C, which is primarily the impedance of the optical modulator portion 4 between the straight lines 8 and 9, is as small as about 20 Ω, since in this portion a semiconductor having a high dielectric constant is in direct contact with the electrode. Therefore, this impedance cannot be matched to the above-mentioned characteristic impedance of 50 Ω. However, with a structure in which the characteristic impedance of the intermediate regions B is designed at a high value of, for example, 100 Ω, higher than those of the regions A and C, and the total length of the regions B and C is set to be sufficiently shorter than, for example, not more than one half of, the wavelength of the signal at the maximum frequency to be transmitted through the circuit (about 7.5 mm for a signal at a maximum frequency of 40 GHz), it is possible to ensure that the characteristic impedance of the region covering the regions B and C can be deemed as the above-mentioned predetermined value of 50 Ω. The change in the impedance of the line can be realized, for example, by changing the ratio between the width of the line 10 and the gap between it and the ground electrode 13. By this method, the region ranging from the modulator driver circuit 5 to the terminal resistor 6 can be approximated to be a line having a consistent impedance of 50 Ω, and the problems such as signal reflection due to impedance non-matching can be restrained.

Incidentally, while in FIG. 1 the high-impedance regions B are provided both on the modulator driver circuit side and on the terminal resistor side of the region C, it is naturally possible to adopt a design in which a high-impedance region with a required length is provided on only one side, for example, on only the modulator driver circuit side of the region C so that the characteristic impedance of the region covering the high-impedance region and the region C can be deemed as 50 Ω.

Incidentally, although regions having a characteristic impedance somewhat different from any of those of the regions A, B and C, such as a connection region 16 between the regions A and B and the ribbon bonding regions 17, are present in the above-mentioned transmission line, these regions are present within a short distance smaller than the minimum wavelength and, therefore, signal reflection does not constitute a serious problem. Further, in the line constituted as above, the region requiring a certain degree of length is the region B having the high impedance, but, by providing a considerable part of the line in this region on the dielectric substrate 1 as shown in FIG. 1, an increase in the area of the semiconductor chip 2 can be prevented.

Now, some embodiments of the present invention will be described. A first embodiment of the optical modulator according to the present invention will be described referring to FIG. 1. For a semiconductor chip 2, a structure comprising an electro-absorption optical modulator using a multiple quantum well (MQW) containing In and P as main constituents as an optical modulator portion 4 was adopted. The semiconductor chip 2 is mounted on a dielectric substrate 1 formed of a ceramic so that the surface thereof provided with the optical modulator is directed up. This mounting method is called the junction-up type.

Figure 2:
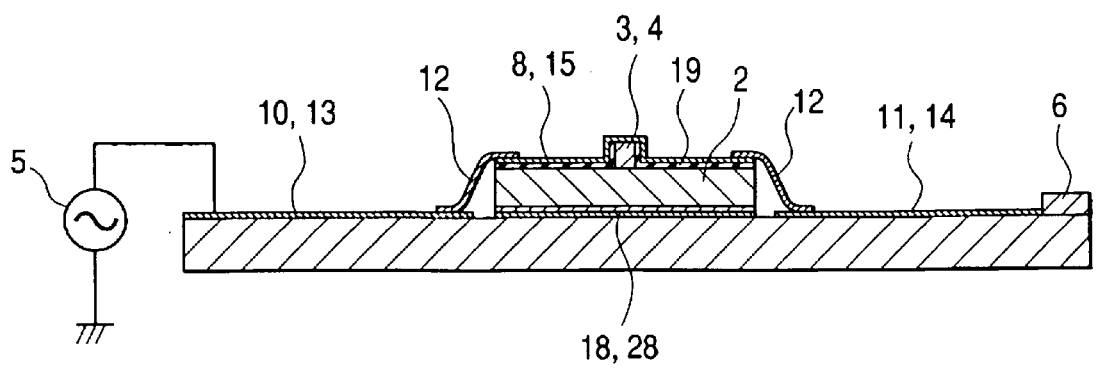
FIG. 2 is a sectional view of the optical modulator shown in FIG. 1.

FIG. 2 is a sectional view of the optical modulator shown in FIG. 1. Transmission lines 10 and 11 and ground electrodes 13 and 14 constituting coplanar lines in cooperation with the transmission lines 10 and 11 are formed on the dielectric substrate 1. Further, a metallic solder layer 18 for attaching the semiconductor chip 2 is formed. An optical waveguide 3, the optical modulator portion 4, the electrode of traveling wave modulator 7, a ground electrode 15, and an insulation film 19 are formed on the upper surface of the semiconductor chip 1. Further, a metallic layer 26 is formed also on the lower surface of the semiconductor chip 1, and is attached to the solder layer 18 by heating. The transmission lines and the ground electrodes on the dielectric substrate 1 and the semiconductor chip 2 are electrically connected by metallic ribbon bonds 12. The solder layer on the lower side of the semiconductor chip 2 is also connected to the ground potential (this point is not shown in the figure).

Figure 3:
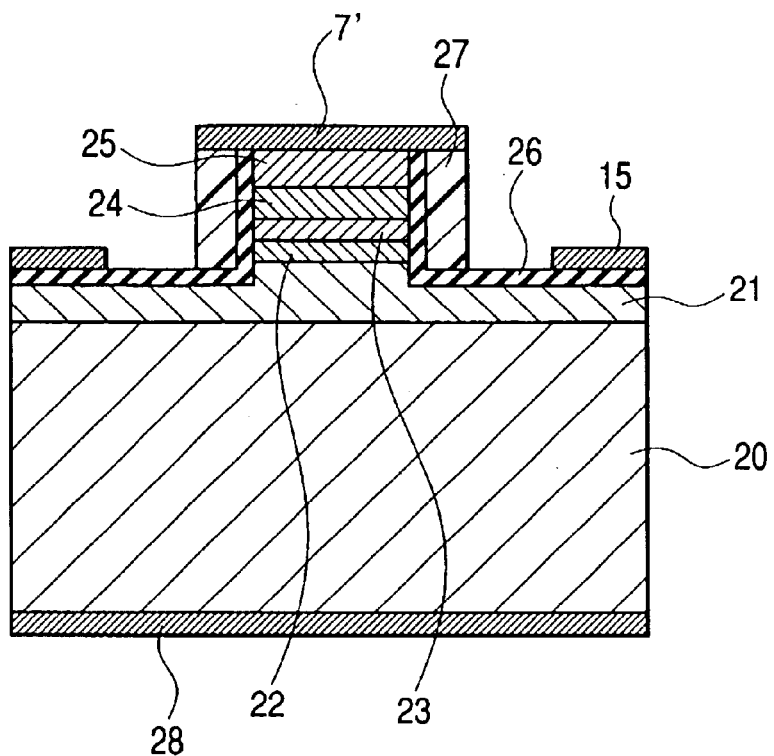
FIG. 3 is a sectional view showing an example of an optical modulator portion of the semiconductor chip.

FIG. 3 is a sectional view of the optical modulator portion 4 of the semiconductor chip 2. Symbol 7' in FIG. 3 denotes an electrode which constitutes the electrode of traveling wave modulator in the optical modulator portion 4 in FIG. 1, and a laminate structure as follows is disposed therebeneath.

First, an In P layer 21 doped with Si in a concentration of $5×10^{18}/cm^3$ is laminated in a thickness of 1.5 μm on an iron-doped semi-insulating InP substrate 20, then an n-side undoped layer 22 is grown thereon in a thickness of 20 nm, and an MQW layer 23 consisting of six layers is grown thereon in a thickness of 90 nm. The MQW 23 had the following constitution. A well layer is composed of compound semiconductor InGaAlAs, has a width of 10 nm, and has a compressive strain of 0.5%. A barrier layer is composed of compound semiconductor InGaAlAs, has a thickness of 5 nm, and has a tensile strain of 0.9%. In this case, the thickness of the MQW layer 23 was 90 nm, and the well and barrier compositions were $In_{0.7}Al_{0.049}Ga_{0.25}As$ and $In_{0.352}Al_{0.1}Ga_{0.54}As$. An undoped layer 24 was formed in a thickness of 90 nm on the MQW layer 23. This layer was reduced in the proportion of Ga as it comes away from the MQW over the thickness of 90 nm so that an InAlAs layer is formed as the uppermost layer. Further, an InP clad layer 25 in a thickness of 1.7 μm was formed thereon.

In the multi-layer semiconductor constituted as above, a mesa for constituting an optical waveguide is formed as shown in FIG. 3, an $SiO_2$ insulation film 26 is formed on portions other than the waveguide for the purpose of planarization and a reduction in capacitance, and a polyimide layer 27 is formed so as to cover the $SiO_2$ insulation film 26 at portions corresponding to side surfaces of the multi-layer semiconductor. Further, an electrode of traveling wave modulator 7' and a ground electrode 15 were formed. The mesa in the multi-layer semiconductor region had a width of 2.5 μm and a height of 2.2 μm. The electrode 7' for constituting a transmission line disposed on the mesa was formed by vapor deposition of gold in a width of 8 μm and a thickness of 800 nm. Further, a metallic film 28 composed mainly of gold was formed on the lower side of the iron-doped substrate 20. The ground electrode 15 and the Si-doped layer 21 are electrically connected, the connection portion being not shown in the figure. A high-frequency voltage is impressed between the electrodes 7' and 15, whereby the light being transmitted through the MQW layer 23 is modulated.

In the constitution as above, the size and characteristic impedance of each portion were designed as follows. The regions A in FIG. 1, i.e., the input port portion of the portion connected to the modulator driver circuit 5 and the connection to the terminal resistor 6 were designed to have the same impedance of 50 Ω as the output impedance of the modulator driver circuit 5. Of the regions B, the dielectric substrate portion was so designed that the width of the transmission line 10 was the same as that of the input port in view of the necessity for ribbon bonding, and the gap between it and the ground electrode was enlarged to form a high-impedance line having an impedance of 110 Ω. The length of the transmission line 10 was 250 μm.

Of the regions B, the semiconductor chip portion was varied in line width so that the width is larger on the ribbon bond side and smaller on the modulator side, to have a high impedance characteristic of 110 Ω and a length of 150 μm. As a result, the two regions B each had a length of about 400 μm (=150+250 μm), the total length being about 800 μm. The length are susceptible to errors at the chip attachment position, the ribbon bond position, etc., but the presence of such errors does not constitute a serious problem. The length of the region C, i.e., the modulator portion 4 between the straight lines 8 and 9, was set to be 150 μm for obtaining sufficient modulation with respect to light. The impedance of this portion was 21 Ω. The total length of the regions B and the region C is 0.95 mm (=950 μm), which is as sufficiently small as ⅛ times the wavelength of 7.5 mm at the maximum signal frequency of 40 GHz to be dealt with by the modulator. Therefore, the characteristic impedance of the line covering the regions B and the region C can be deemed as 50 Ω, so that there is no impedance non-matching between it and the input port portion having an impedance of 50 Ω.

Figure 4:
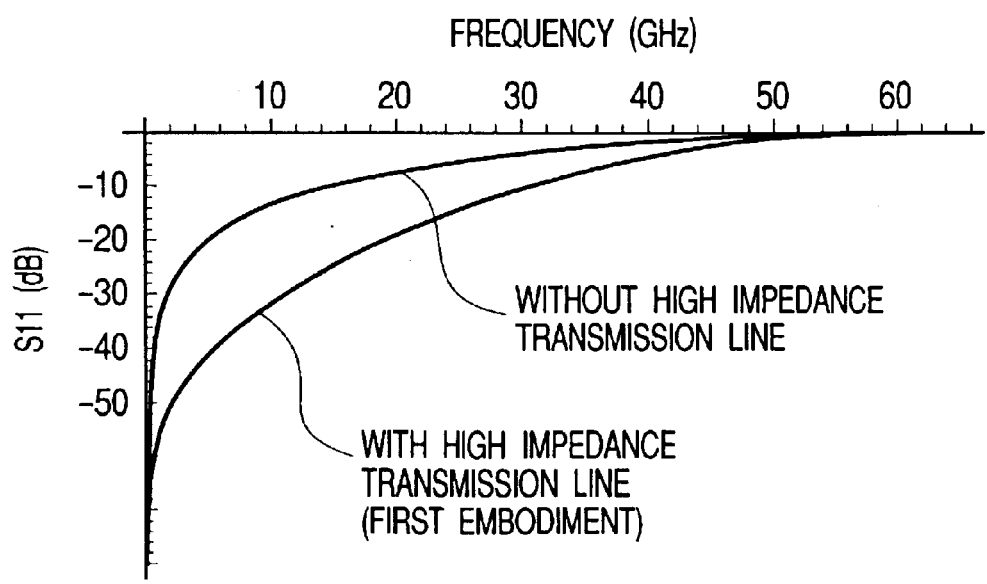
FIG. 4 comparatively shows frequency dependence of S11 characteristic in an optical modulator, in the case of the present invention and in the case of the prior art.

FIG. 4 comparatively shows S11 characteristics in the case of the prior art where a 50 Ω line and a low-impedance optical modulator are connected without using a high-impedance line and in the case of the present embodiment. The S11 characteristic is the ratio between the high-frequency power inputted from the modulator driver circuit 5 and the power reflected due to impedance non-matching or the like; as the minus-signed value of this ratio is greater, the reflected power is less, i.e., the characteristic is better. Incidentally, an S11 value of 0 dB means that the inputted power and the reflected power are equal, i.e., no signal power is inputted. As shown in FIG. 4, the constitution according to the present invention gives an S11 characteristic which is largely shifted to the minus side, meaning that the characteristic was improved greatly.

In addition, where the high-impedance line with a total length of 800 μm is wholly provided on the modulator chip, the chip width would be not less than 1 mm. On the other hand, in the constitution according to the first embodiment of the present invention, the chip width can be reduced to or below 500 μm. This is an extremely profitable merit on an industrial basis, in the case of the electro-absorption optical modulator chip where an expensive semiconductor substrate is used. Incidentally, the regions A are 50 Ω lines, so that they are free of the restriction that the length thereof must be within the wavelength of the signal. However, it is preferable that the regions A have such a length that the heat generation in the modulator driver circuit 5 and the terminal resistor 6 does not impose influences on the semiconductor chip 2. In the present embodiment, this length was set to be 2 mm.

Figure 5:
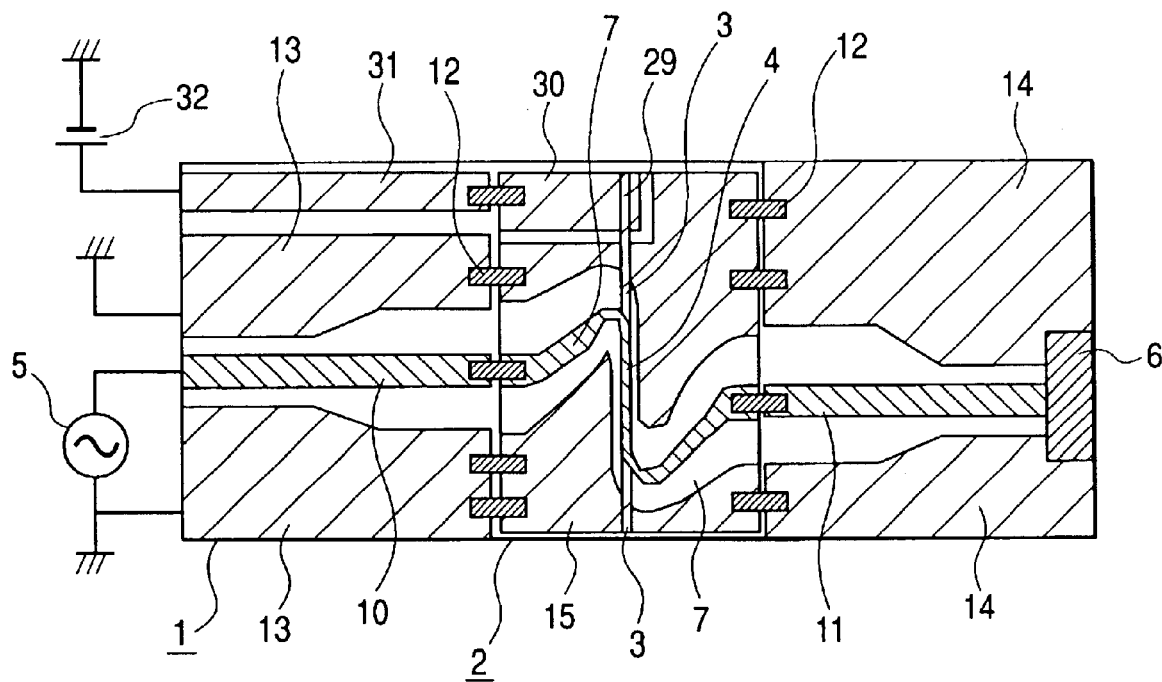
FIG. 5 is a plan view showing a second embodiment of the present invention in which a semiconductor laser is integrated on a semiconductor chip.

FIG. 5 shows a second embodiment of the present invention. In this embodiment, a semiconductor laser element 29 is integrated together with a semiconductor optical modulator 4 on a semiconductor chip 2 mounted on a dielectric substrate 1.

The semiconductor laser element is supplied with DC power for laser driving from an external DC power source 32 through a laser electrode 30 and a laser conductor 31. In this constitution, as in the case of the first embodiment, there is the merit that it is unnecessary to input light to an optical waveguide 3 from an external laser so that the optical modulator is simple in constitution. Further, as shown in FIG. 6 which shows a third embodiment of the present invention, when a terminal resistor 6 is also integrated on the semiconductor chip 2, there is obtained the merit of simple constitution of the optical modulator although it is necessary to take account of heat generation at the terminal resistor 6.

Figure 6:
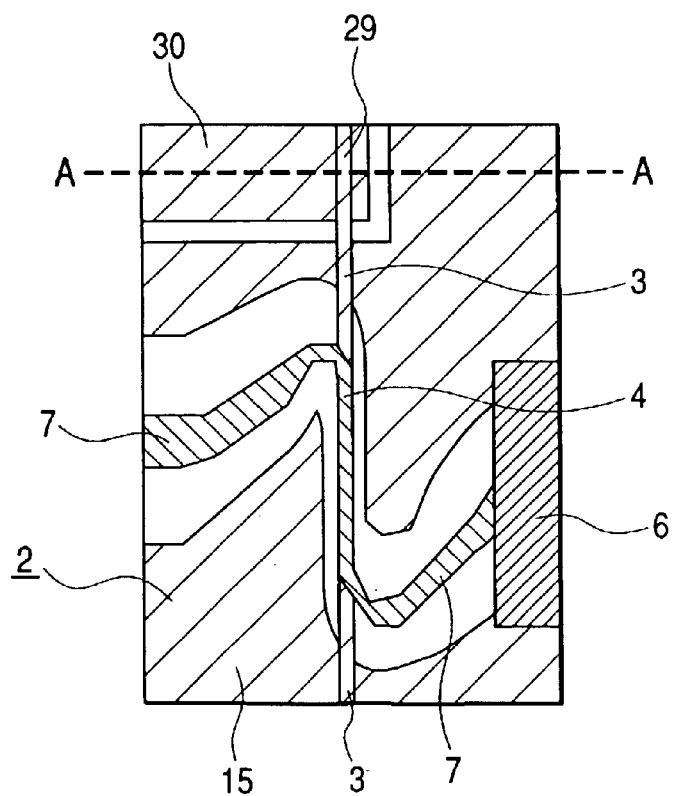
FIG. 6 is a plan view of a semiconductor chip, showing a third embodiment of the present invention in which a semiconductor laser and a terminal resistor are integrated on a semiconductor chip.
Figure 7:
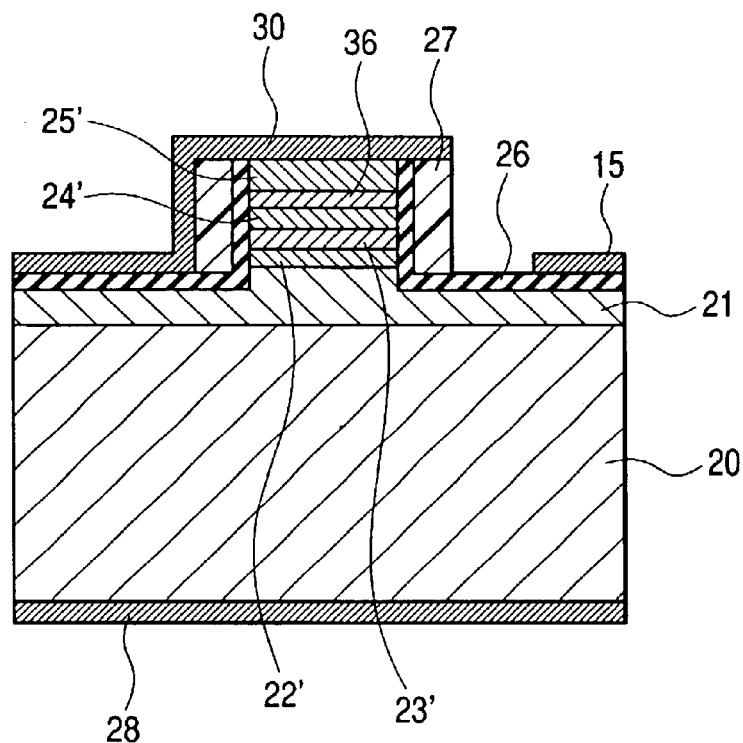
FIG. 7 is a sectional view taken of a semiconductor laser portion, taken along a plane orthogonal to the traveling direction of light.

FIG. 7 is a sectional view of a semiconductor laser portion taken along line AA of FIG. 6, of the device shown in FIG. 6. This portion basically has a constitution using layers common with FIG. 7, and, therefore, only the portion for laser emission will be described. The same symbols as in FIG. 3 denote the same portions as in FIG. 3. An undoped layer 22, an MQW layer 23, an undoped layer 24, and a clad layer 25 are laminated on an Si-doped InP layer 21 provided on an InP substrate 20. The MQW layer 23 constitutes an active layer region. In this embodiment, a diffraction grating 36 is formed on the undoped layer 24. An electrode 30 on one side is formed on this semiconductor laminate. Each semiconductor layer may well have the same basic constitution as the corresponding layer in the optical modulator shown in FIG. 3, except that the thickness and the dopant concentration are set according to the desired characteristics of the semiconductor laser. Naturally, a desired design is arbitrarily adopted, according to the characteristics required of the semiconductor laser element.

Figure 8:
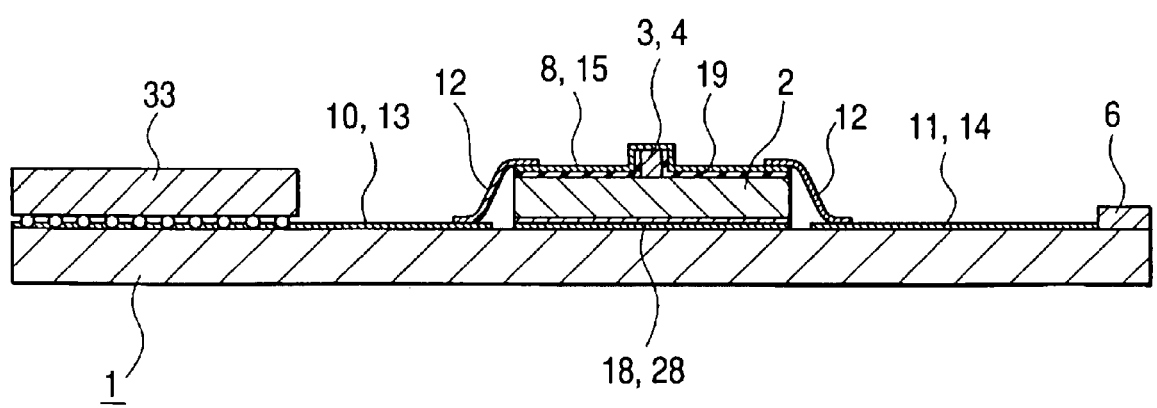
FIG. 8 is a sectional view showing a fourth embodiment of the present invention in which a modulator driver IC is mounted on a dielectric substrate.

FIG. 8 is a sectional view showing a fourth embodiment of the present invention. This embodiment is an example in which an IC chip 33 with a modulator driver circuit integrated therein is mounted on a dielectric substrate 1. The other points of constitution are the same as in the embodiment shown in FIG. 2, and the description thereof is omitted. In this constitution, since a driver IC 33 is connected directly to lines provided on the dielectric substrate 1, the constitution of the optical modulator is simplified, though the influence of heat generation in the IC chip on the semiconductor chip 2 is increased.

Figure 9:
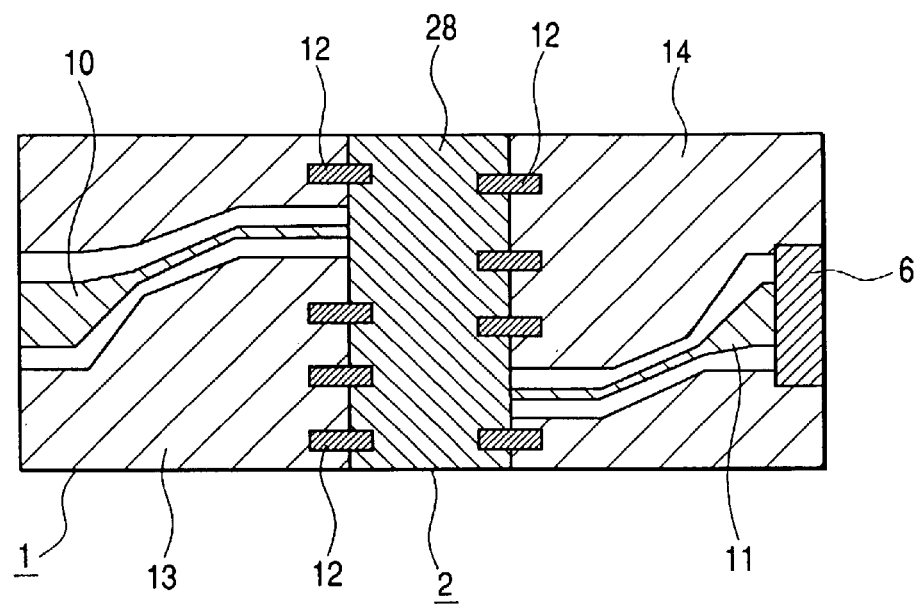
FIG. 9 is a plan view showing a fifth embodiment of the present invention in which a semiconductor chip is mounted on a dielectric substrate in a junction-down mode.
Figure 10:
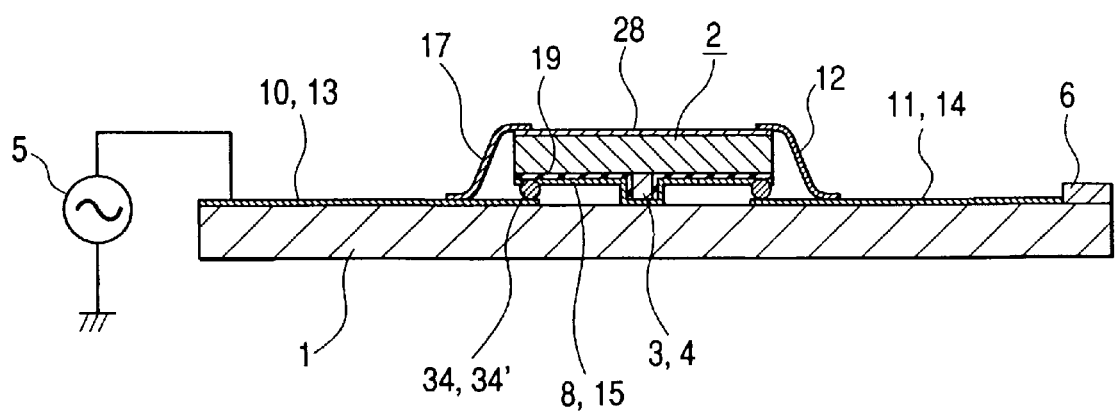
FIG. 10 is a sectional view showing an example of the optical modulator portion of FIG. 9.

FIG. 9 is a plan view showing a fifth embodiment of the present invention. This embodiment is an example of a mounting method in which a semiconductor chip 2 is mounted on a dielectric substrate 1 so that the surface provided with a modulator is directed down. This mounting method is called junction-down mounting. FIG. 10 is a sectional view of FIG. 9. Comparing FIG. 10 with FIG. 2, the upper and lower sides of the semiconductor chip 2 relative to the mounting substrate 1 are reversed.

Figure 11A:
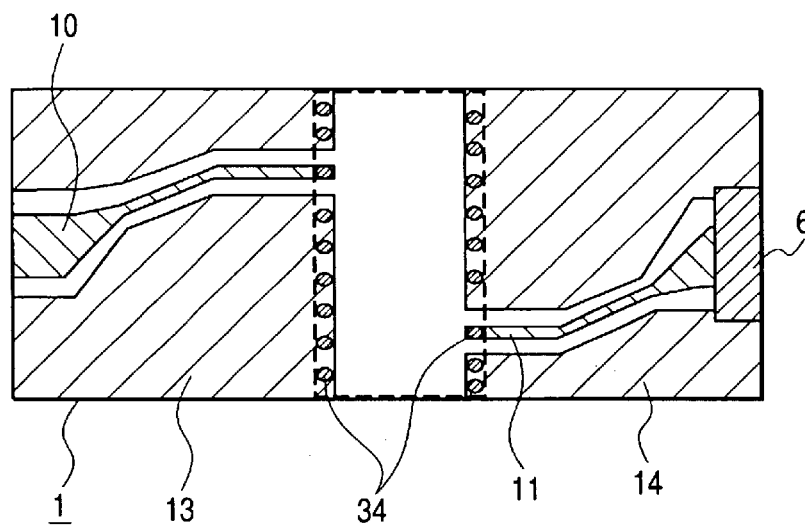
FIGS. 11A and 11B are plan views for illustrating the dielectric substrate and the semiconductor chip, before the junction-down mounting in the fifth embodiment.
Figure 11B:
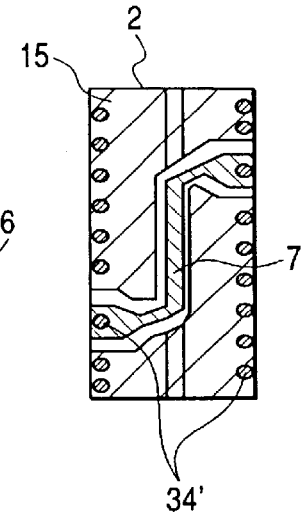

FIGS. 11A and 11B show patterns of transmission lines on a dielectric substrate 1 and a semiconductor chip 2 before mounting of the chip on the substrate. FIG. 11A is a plan view of the dielectric substrate 1, and FIG. 11B is a plan view of the semiconductor chip 2. Incidentally, FIG. 11B shows the surface of the semiconductor chip 2 which is to be adhered to the dielectric substrate 1 through reversion. In FIGS. 11A and 11B, Au—Sn solder metals 34 and 34' are provided at corresponding positions of a transmission line 10 and a ground electrode 13 on the dielectric substrate 1 and a transmission line 7 and a ground electrode 15 on the semiconductor chip 2. The semiconductor chip 2 in this condition is reversed upside down, is pressed against the broken-line position of FIG. 11A, and is heated. By this, the solders 34 and 34' are melted, the semiconductor chip is fixed, and the electrodes are electrically connected to each other. With this constitution, the width of the lines can be reduced and the length of the connection portions can also be reduced, since ribbon bonds are not used for electrical connection. In this system, since the electrode area in the semiconductor chip 2 is small, the area of the semiconductor chip 2 can be reduced further.

Figure 12:
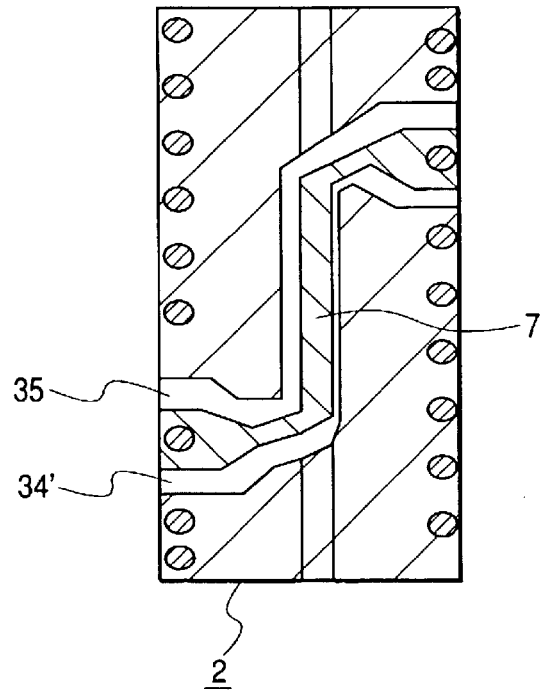
FIG. 12 is a plan view of a semiconductor chip showing a sixth embodiment of the present invention in which a semiconductor chip is provided with a chip test pad, in the junction-down mounting.

FIG. 12 is a plan view showing a sixth embodiment of the present invention. Like FIG. 11B, FIG. 12 shows only the surface of a semiconductor chip to be adhered to a dielectric substrate. The mounting substrate is basically the same as that of FIG. 11A. A chip test pad may be provided by enlarging a little the width of bonding portions of an electrode of traveling wave modulator 7, as shown in the figure. In this case, contact of a test probe can be preliminarily carried out by using the chip test pad.

FIG. 13 shows a seventh embodiment of the present invention. This embodiment is an example in which a semiconductor chip is mounted on a dielectric substrate in a junction-down mode by the following method. Namely, conductor lines consisting of a transmission line 10 and a modulator electrode 7 are formed on the dielectric substrate 1, only a ground electrode 15 and an electrode 7' making contact with a semiconductor are formed on the semiconductor chip 2, and junction-down mounting is carried out by use of solders 34 and 34'. The characteristic impedances of transmission lines in regions A and regions B are designed to be 50 Ω and 110 Ω, respectively. By this method, the electrode area required on the semiconductor chip is further reduced. Therefore, there is the merit that the area of the semiconductor chip can be further reduced.

Incidentally, while the high-impedance line is provided on both the input side and the output side of the optical modulator 4 in the above embodiments, it is natural that the high-impedance line may be provided at one position or at three or more positions, and the high-impedance lines may not necessarily have the same impedance value, provided that the impedance of the high-impedance line(s) in total is matched to 50 Ω.

According to the present invention, an optical modulator using an electro-absorption semiconductor optical modulator comprising an electrode of traveling wave modulator in which reflection of a high-frequency signal inputted from a modulator driver circuit is little can be realized with a small semiconductor chip area, which is greatly profitable on an industrial basis.

According to the present invention, it is possible to provide, in a small size, a semiconductor optical modulator in which reflection of an externally inputted high-frequency signal is little.

In order to ease understanding of the drawings, the major symbols used in the drawings will be explained.

1: dielectric substrate; 2: semiconductor chip; 3: optical waveguide; 4: optical modulator portion; 5: modulator driver circuit; 6: terminal resistor; 7: transmission line; 7: electrode of traveling wave modulator; 8, 9: straight lines as extensions, orthogonally to the traveling direction of light, of both ends of the width in the traveling direction of light of optical modulator portion; 10, 11: transmission line; 12: ribbon bond; 13, 14, 15: ground electrode; 16: connection regions of transmission line different in characteristic impedance; 17: ribbon bond region; 18: solder layer; 19: insulation film; 20: InP substrate; 21: Si-doped InP layer; 22: undoped layer; 23: MQW layer; 24: undoped layer; 25: clad layer; 26: insulation film; 27: polyimide layer; 28: metal on back side of chip; 29: semiconductor laser; 30: laser electrode; 31: laser conductor; 32: DC power source; 33: modulator driver IC; 34, 34': solder metal; 35: chip test pad; 36: diffraction grating.

What is claimed is:

1. A traveling wave optical modulator comprising at least a transmission line, and a semiconductor chip provided at least with an electro-absorption semiconductor optical modulator, on a dielectric substrate, wherein said electro-absorption semiconductor optical modulator comprises at least an electrode of traveling wave modulator, and an optical waveguide overlapping with said electrode of traveling wave modulator and having a region parallel to said electrode of traveling wave modulator, said transmission line is connected at least electrically to a first end portion of said electrode of traveling wave modulator of said electro-absorption semiconductor optical modulator, said semiconductor optical modulator can be driven by inputting a high-frequency signal from a modulator driver circuit to said transmission line, and the characteristic impedance of at least a part of said transmission line is greater than the output impedance of said semiconductor optical modulator.

2. A traveling wave optical modulator comprising at least a first transmission line, a semiconductor chip provided at least with an electro-absorption semiconductor optical modulator, and a second transmission line, on a dielectric substrate, wherein said electro-absorption semiconductor optical modulator comprises at least an electrode of traveling wave modulator, and an optical waveguide overlapping with said electrode of traveling wave modulator and having a region parallel to said electrode of traveling wave modulator, said first transmission line is connected at least electrically to a first end portion of said electrode of traveling wave modulator of said electro-absorption semiconductor optical modulator, said second transmission line is connected at least electrically to a second end portion of said electrode of traveling wave modulator of said electro-absorption semiconductor optical modulator, said semiconductor optical modulator can be driven by inputting a high-frequency signal from a modulator driver circuit to said first transmission line, and the characteristic impedance of at least a part of said first transmission line is greater than the output impedance of said modulator driver circuit.

3. A traveling wave optical modulator as set forth in claim 1, wherein said transmission line is electrically connected to a first end portion of said electro-absorption semiconductor optical modulator through a first transmission line on said semiconductor chip.

4. A traveling wave optical modulator as set forth in claim 2, wherein said first transmission line is electrically connected to a first end portion of said electro-absorption semiconductor optical modulator through a first transmission line on said semiconductor chip, and said second transmission line is electrically connected to a second end portion of said electro-absorption semiconductor optical modulator through a second transmission line on said semiconductor chip.

5. A traveling wave optical modulator as set forth in claim 1, wherein the characteristic impedance of at least a part of said first transmission line is greater than the input impedance of said semiconductor optical modulator from an end portion of said transmission line.

6. A traveling wave optical modulator as set forth in claim 2, wherein the characteristic impedance of at least a part of said first transmission line is greater than the input impedance of said electro-absorption semiconductor optical modulator from an end portion of said first transmission line.

7. A traveling wave optical modulator as set forth in claim 3, wherein said semiconductor chip further has a semiconductor laser integrated thereon and is so constituted that light emitted from said semiconductor laser is incident on an optical waveguide of said electro-absorption semiconductor optical modulator.

8. A traveling wave optical modulator as set forth in claim 4, wherein said semiconductor chip further comprises a terminal resistor for terminating a signal having driven said optical modulator.

9. A traveling wave optical modulator as set forth in claim 1, wherein said semiconductor chip provided with said semiconductor optical modulator is mounted on said dielectric substrate so that the primary surface thereof provided with an active portion is directed up, said semiconductor chip is provided thereon with a transmission line electrically connected to said electrode of traveling wave modulator possessed by said semiconductor optical modulator, and said transmission line on said semiconductor chip is electrically connected through a metallic ribbon to said transmission line of said semiconductor chip on which said semiconductor optical modulator is mounted.

10. A traveling wave optical modulator as set forth claim 1, wherein said semiconductor chip provided with said electro-absorption semiconductor optical modulator is mounted on said dielectric substrate so that the primary surface thereof provided with an active portion is directed up, transmission lines on said semiconductor chip which are electrically connected to both ends of said electrode of traveling wave modulator possessed by said electro-absorption semiconductor optical modulator are respectively a third transmission line and a fourth transmission line, said first transmission line is electrically connected through a metallic ribbon to said third transmission line on said semiconductor chip on which said electro-absorption semiconductor optical modulator is mounted, and said second transmission line is electrically connected through a metallic ribbon to said fourth transmission line on said semiconductor chip on which said electro-absorption semiconductor optical modulator is mounted.

11. A traveling wave optical modulator as set forth claim 1, wherein said semiconductor chip provided with said electro-absorption semiconductor optical modulator is mounted on said dielectric substrate so that the primary surface thereof provided with an active portion is directed down, said first transmission line is electrically connected through a solder layer to a first transmission line on said semiconductor chip on which said electro-absorption semiconductor optical modulator is mounted, and said second transmission line is electrically connected through a solder layer to a second transmission line on said semiconductor chip on which said electro-absorption semiconductor optical modulator is mounted.

12. A traveling wave optical modulator as set forth claim 1, wherein a circuit for driving said electro-absorption semiconductor optical modulator is further provided on said dielectric substrate.

13. A traveling wave optical modulator as set forth in claim 1, wherein a resistor for terminating a signal for driving said electro-absorption optical modulator is further mounted on said dielectric substrate and is electrically connected to said second transmission line.

* * * * *